United States Patent
Yamaguchi et al.

(10) Patent No.: US 6,222,154 B1
(45) Date of Patent: Apr. 24, 2001

(54) PLASMA CUTTING METHOD AND DEVICE WITH THE USE OF A PLASMA TORCH

(75) Inventors: Yoshihiro Yamaguchi; Tetsuya Kabata; Kenichi Nishihara, all of Ishikawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/566,731

(22) Filed: May 9, 2000

(30) Foreign Application Priority Data

May 12, 1999 (JP) .................................................. 11-131107

(51) Int. Cl.$^7$ ................................................... B23K 10/00
(52) U.S. Cl. ................................ 219/121.39; 219/121.44; 219/121.54
(58) Field of Search ..................... 219/121.39, 121.44, 219/121.46, 121.55, 121.54, 121.57, 74, 75

(56) References Cited

U.S. PATENT DOCUMENTS

| | | | |
|---|---|---|---|
| 4,156,125 | * 5/1979 | Brown | 219/124.02 |
| 4,918,283 | * 4/1990 | Yamade et al. | 219/121.46 |
| 5,393,952 | * 2/1995 | Yamaguchi et al. | 219/121.5 |
| 5,695,663 | * 12/1997 | Shintani et al. | 219/121.44 |

FOREIGN PATENT DOCUMENTS

| | | |
|---|---|---|
| 5-84579 | 4/1993 | (JP) . |
| 2689310 | 8/1997 | (JP) . |

* cited by examiner

Primary Examiner—Mark Paschall
(74) Attorney, Agent, or Firm—Armstrong, Westerman, Hattori, McLeland & Naughton, LLP

(57) ABSTRACT

An object of the present invention is, in plasma cutting using a plasma torch of the double-swirl type, to make it possible to maintain the bevel angle always constant, irrespective of the shape of the cutting line, and thereby to raise the accuracy of the cutting track.

In locations where the cutting line is a straight line or a comparatively gentle curve, NC control unit 83 makes the cutting speed high and gas control unit 85 makes the secondary gas flow rate or secondary gas strength of rotation high. In locations where the cutting line is a corner or a comparatively sharp curve, NC control unit 83 makes the cutting speed low and gas control unit 85 makes the secondary gas flow rate or strength of rotation comparatively low. NC control unit 83 determines the speed of cutting in accordance with the magnitude of the curvature of the cutting line such that the positional offset between the upper kerf track and lower kerf track caused by the cutting lag is below a prescribed allowed value. Gas control unit 85 determines the secondary gas flow rate or strength of rotation in accordance with the cutting speed such that, whatever the cutting speed, the bevel angle of the work on the product side is 0 degrees.

11 Claims, 8 Drawing Sheets

(A)  (B)

PLASMA CUTTING METHOD AND DEVICE WITH THE USE OF A PLASMA TORCH

BACKGROUND OF THE INVENTION

1. Field of the Invention

The present invention relates to plasma arc cutting technology, and in particular relates to an improved method of use of secondary gas, with the object of improving the bevel angle of the cut faces.

2. Description of the Related Art

In U.S. Pat. No. 2,689,310, adjustment of the bevel angle of the cut surfaces is made possible by means of the strength of rotation of a secondary gas rotary flow, by supplying a secondary gas rotary flow that rotates in the same direction at the circumference of the rotating plasma arc. By the way "bevel angle" is meant the angle made by the cut surface with the surface perpendicular to the work under-surface. In general, in plasma cutting, as shown in FIG. 1(A), the cross-sectional shape of the kerf (cut groove) 5 of a work 3 has a tapered shape which becomes narrower at greater depth (i.e. the upper kerf width is wider and the lower kerf width is narrower), due to pinching of the plasma arc 1. Consequently, the cut surfaces 7L and 7R on both sides are not perpendicular (bevel angle 0 degrees) with respect to the work under-surface 9, but tapered by a few degrees. The degree of this taper increases as the cutting speed is made higher. However, if a secondary gas rotary flow is supplied in the same rotary direction at the circumference of the plasma arc rotary flow, as shown in FIG. 1(B), when the plasma arc 1 reaches work 3, the central axis 1A of plasma arc 1 is bent over and inclined in the right or left direction towards the cutting direction (i.e. the direction going from in front of the plane of the drawing in FIG. 1 to behind the plane of the drawing) (whether to right or left is determined by the direction of rotation; in the example of FIG. 1, the arc 1 is inclined to the right due to the rightwards rotary direction seen from above). Consequently, at the cut surface 7R on the side where arc axis 1A is inclined, the bevel angle is corrected towards the 0 degrees direction. When the strength of the secondary gas rotary flow (i.e. the secondary gas flow rate) is increased, the angle of inclination of the arc axis becomes correspondingly larger, so it is possible not only, of course, to correct the bevel angle to 0 degrees but also to perform over-correction further to the opposite side beyond 0 degrees. Consequently, by setting the strength of the secondary gas rotary flow (secondary gas flow rate) to a suitable value, the bevel angle can be adjusted to a desired value (typically, 0 degrees).

In this specification, this technique is termed the "double swirl technique", meaning a "double rotary flow of the plasma arc and secondary gas". By means of the double swirl technique, cutting at high speed can be achieved, thus enabling the productivity of plasma cutting devices to be raised.

In general in a plasma cutting device, cutting proceeds while a plasma torch is displaced with respect to the work along a cutting line matching the shape of the product that is to be cut out, by means of a displacement system whereby the plasma torch is held and displaced in the XY directions. In this process, while high-speed cutting is performed in regions of the cutting line which are straight lines or gentle curves, in the region of corners or sharp curves, or holes, in particular holes of small diameter, cutting is performed at low speed. The reason for this is that, since the direction of displacement changes abruptly at corners, sharp curves or holes etc., the XY displacement system is unable to track this at high speed, so there is a deterioration of accuracy of the cutting track.

The degree of taper of the cut surfaces illustrated in FIG. 1(A) is large during high-speed cutting but small during low-speed cutting. This therefore gives rise to the problem that, if it is assumed that, in plasma cutting in which the double swirl technique is adopted, the intensity of the secondary gas rotary flow (secondary gas flow rate) is set such that the bevel angle is exactly 0 degrees during high-speed cutting of straight lines or gentle curves of the cutting line, when cutting of corners or sharp curves is performed at low speed, the bevel angle is over-corrected and is therefore not 0 degrees.

Also, as shown in FIG. 2, there is the phenomenon that, at the leading face 11 of cutting of work 3, cutting at the bottom lags behind cutting at the top (hereinafter, the distance 13 representing the amount of the lag of cutting at the lower edge with respect to the upper edge of the leading cutting face 11 is termed the "cutting lag"). Consequently, in particular at locations where the direction of cutting changes considerably such as at corners or sharp curves, a positional offset is produced between the track on the upper side of kerf 5 (hereinafter this is called the "upper kerf track") 15 and the track on the lower side thereof (hereinafter this is called the "lower kerf track") 17. For example, FIG. 3 illustrates a plan view of a work 3 in the vicinity of a corner 19A of a cutting line 19. Although the upper kerf track 15 (shown by the solid line) faithfully corresponds to the displacement of the plasma torch, cutting out an accurate corner 19A having a sharp edge, the lower kerf track 17 (shown by the broken line for ease of visibility) takes a short-cut on the inside of corner 19A and so cannot cut a sharp edge because of cutting lag. Thus, since positional offset between the upper and lower kerf tracks 15 and 17 is produced by the cutting lag, not only does the bevel angle change, but also the accuracy of the cutting track (in particular that of the lower kerf track 17) is adversely affected.

SUMMARY OF THE INVENTION

Consequently, an object of the present invention, in plasma cutting wherein the double swirl technique is adopted, is to enable the bevel angle to be always maintained constant, so that the accuracy of the cutting track can be raised, whatever the shape of the cutting line is.

In a method and device for plasma cutting according to the present invention when a work is cut along a cutting line using a plasma torch of the double-swirl type, the flow rate of the secondary gas or the strength of rotation of the secondary gas is varied in correspondence with changes of said cutting speed. In this way, even if the degree of taper of the kerf changes depending on the cutting speed, the fluctuation of bevel angle can be reduced by arranging to vary the bevel angle correction amount by adjusting the secondary gas flow rate or strength of rotation so as to compensate for this.

In a preferred embodiment, there are selectively employed: (1) a first flow rate condition wherein, when said cutting speed is comparatively high, said secondary gas flow rate or said secondary gas strength of rotation is made comparatively high; and (2) a second flow rate condition wherein, when said cutting speed is comparatively low, said secondary gas flow rate or said secondary gas strength of rotation is made comparatively low.

Preferably, the secondary gas flow rate or strength of rotation is controlled in accordance with the cutting speed such that the bevel angle of the work on the product side is maintained practically fixed at a prescribed value even if the cutting speed varies.

In a preferred embodiment, as a method of varying the cutting speed, there are selectively employed: (1) a first speed condition in which, in locations where said cutting line is a straight line or a comparatively gentle curve, said cutting speed is made comparatively high; and (2) a second speed condition in which, in locations where said cutting line is a corner or a comparatively sharp curve, said cutting speed is made comparatively low. Alternatively, there are selectively employed: (1) a first speed condition in which, in locations corresponding to portions of said cutting line other than corners of the external shape of the product, said cutting speed is made comparatively high; and (2) a second speed condition in which, in locations of said cutting line corresponding to said corners or holes, said cutting speed is made comparatively low. By means of such cutting speed control in accordance with the location of the cutting line, the positional offset between the upper kerf track and the lower kerf track caused by cutting lag can be reduced.

Preferably, the cutting speed is adjusted in accordance with the location of the cutting line such that the positional offset between the upper and lower kerf tracks produced by cutting lag is smaller than a prescribed allowed value at all locations on the cutting line.

Since, in the preferred embodiments, the bevel angle is controlled by the above method, tilting of the plasma torch for bevel angle control is not performed, the plasma torch being always perpendicular with respect to the work surface during work cutting. This fact renders a complicated mechanism and/or control for tilting the plasma torch unnecessary, and so contributes greatly to reducing the cost of the plasma cutting device.

DESCRIPTION OF THE PREFERRED EMBODIMENTS

Figure 1:
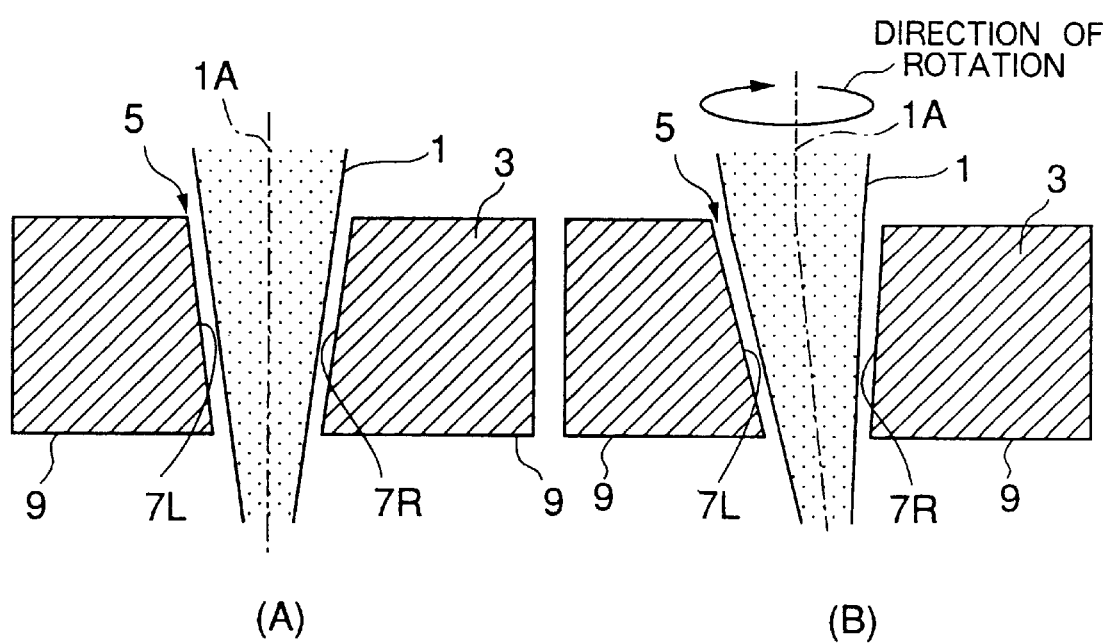
FIG. 1 is a cross sectional view illustrating (FIG. 1(A)) the taper of the kerf in plasma cutting, and (FIG. 1(B)) how the bevel angle is corrected by a double-swirl system.
Figure 2:
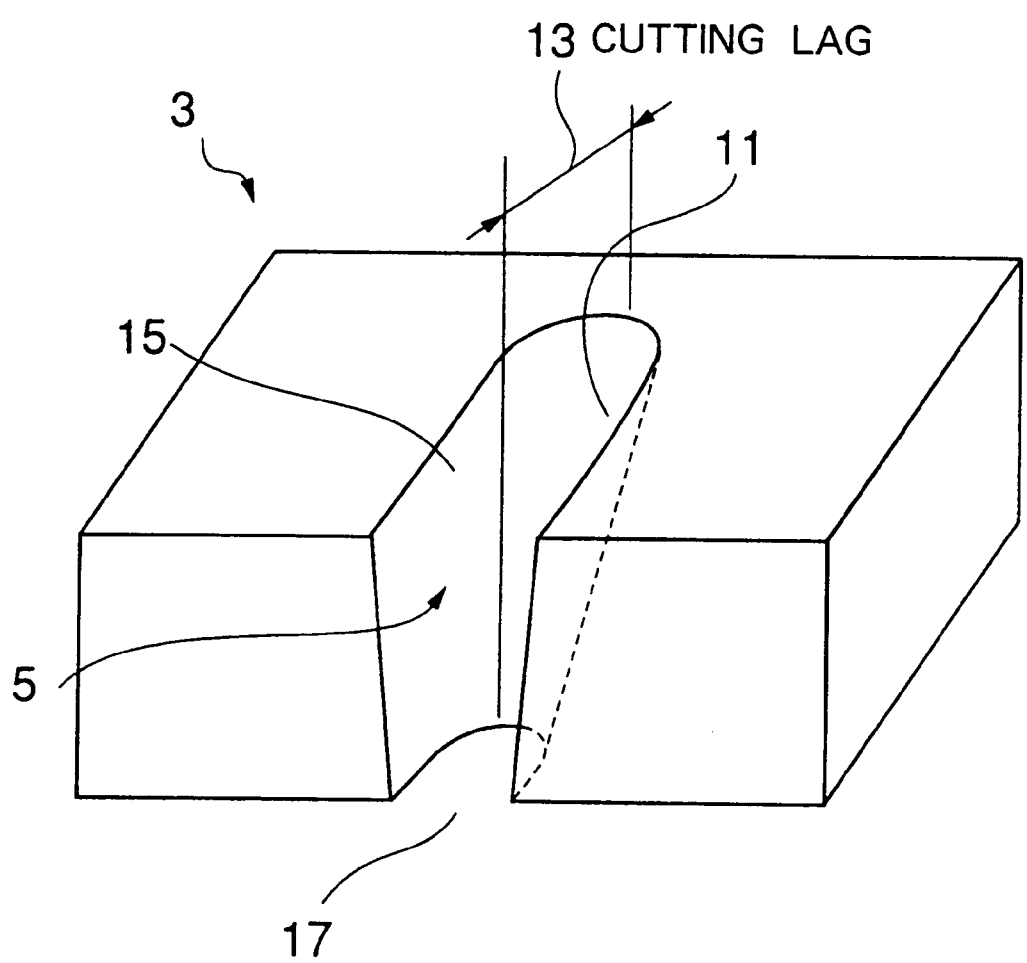
FIG. 2 is a perspective view illustrating the cutting lag of the leading face of cutting.
Figure 3:
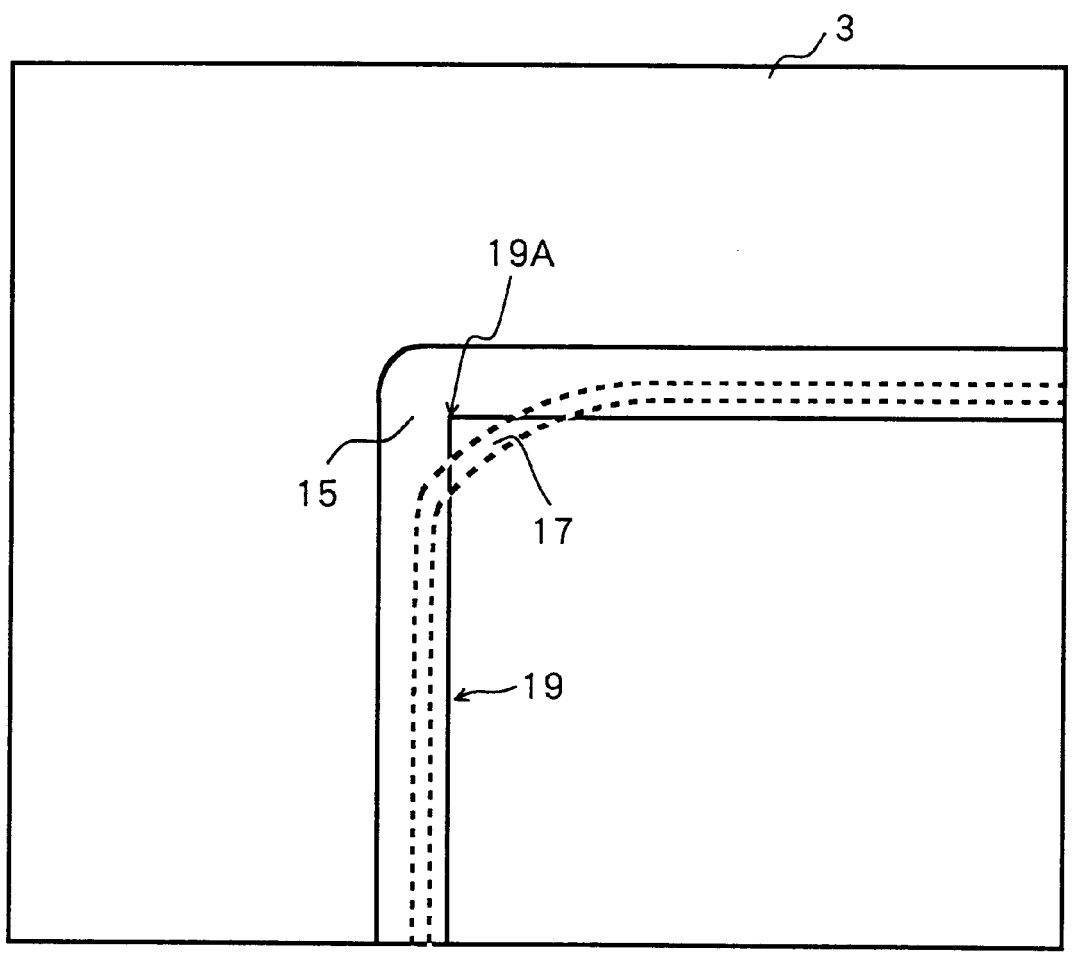
FIG. 3 is a plan view of a work illustrating an example of deterioration of accuracy of the bottom kerf track in the vicinity of a corner, due to cutting lag.
Figure 4:
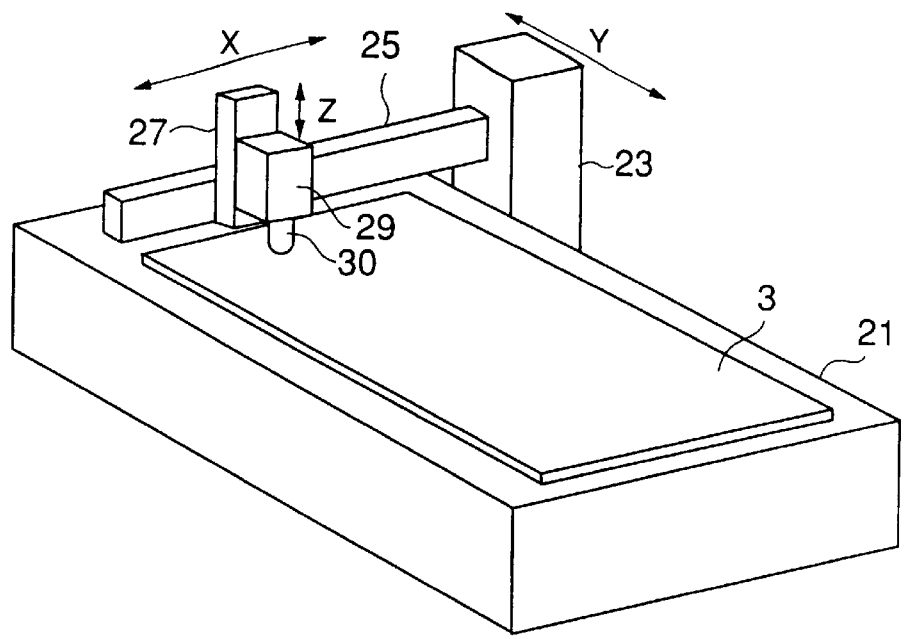
FIG. 4 is a perspective view illustrating the external appearance of an entire plasma cutting device according to an embodiment of the present invention.

FIG. 4 is an external view of an entire plasma cutting device according to an embodiment of the present invention.

Y carriage 23 is arranged so that it can be displaced horizontally in the Y direction with respect to a stage 21 on which is horizontally laid a steel plate constituting work 3. Guide rails 25 extend in the X direction from this Y carriage 23, so that an X carriage 27 can be displaced in the X direction horizontally along these guide rails 25. A Z carriage 29 that is displaced in the Z (perpendicular) direction is mounted on X carriage 27; a plasma torch 30 facing directly downwards is fixed onto this Z carriage 29. Plasma torch 30, whilst work 3 is being cut, is displaced horizontally in the X and Y directions along a cutting line matching the product shape, in a condition maintaining a fixed stand-off (distance from the upper surface of the work to the tip of the torch) with respect to work 3, by means of the XYZ displacement system constituted by carriages 23, 27, 29.

This plasma cutting device, thanks to control of the cutting speed and secondary gas flow rate, to be described, always maintains the bevel angle at a desired value (typically, 0 degrees) whatever the shape of the cutting line of work 3, keeping plasma torch 30 pointing directly downwards during cutting. This plasma cutting device is therefore not provided with a device for tilting torch 30 for adjustment of bevel angle during cutting (such devices are very expensive); thus, it has the merit that its cost is much lower in comparison with conventional plasma cutting devices, which do have such a tilting device.

Figure 5:
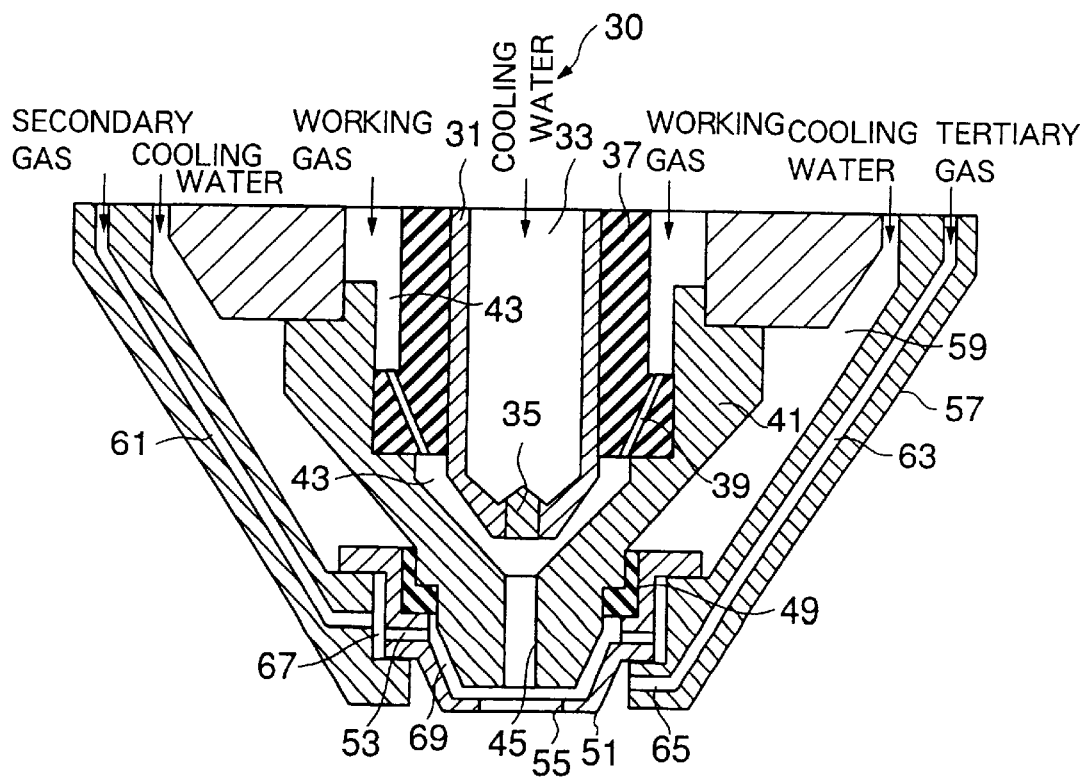
FIG. 5 is a cross sectional view illustrating an example of a plasma torch 30 in which the double-swirl system is adopted.

For the plasma torch 30 of this plasma cutting device, in principle any plasma torch may be employed so long as it uses the double swirl technique. FIG. 5 shows an example of a plasma torch 30 in which the double swirl technique is adopted.

Torch 30 is provided with a cylindrical electrode 31 at a central axial position thereof. Electrode 31 is provided in its interior with a cooling water passage 33, and a heat-resistant insert 35 made of for example hafnium is provided at its tip where the arc is generated. The periphery of electrode 31 is surrounded, with an insulating ring 37 disposed therebetween, by a roughly cylindrical nozzle 41 that is tapered towards its tip. The space 43 between the nozzle 41 and electrode 31 is a working gas passage, and insulating ring 37 is provided at some point along this working gas passage 43. Insulating ring 37 is provided with a plurality of through-holes (i.e. working gas swirler) 39 formed at fixed intervals, being inclined towards the circumferential direction so as to impart rotation to the working gas passing therethrough. The working gas rotary flow that is ejected from working gas swirler 39 is converted to a plasma by the energy of the arc issuing from heat-resistant insert 35 and passes through the nozzle orifice 45 at the tip of nozzle 41, whence it is ejected forwards as a plasma rotary flow.

The outside of the tip of nozzle 41 is covered by a nozzle protective cap 51 of short cylindrical shape, with interposition of an insulating ring 49. In turn, the outside of this construction is covered by a cylindrical holding cap 57 that is tapered towards its tip. Holding cap 57, although not shown, is fixed to the torch body at its base, and thereby holds the major components such as electrode 35 and nozzle 41 that are provided within it. The space 59 between holding cap 57 and nozzle 41 is a cooling water passage; cooling water that passes through this cooling water passage 59 simultaneously cools nozzle 41, nozzle protecting cap 51 and holding cap 57.

Within holding cap 57, there are alternately formed a large number of secondary gas passages 61 and tertiary gas passages 63 at fixed intervals in radial fashion, centered on the central axis of the torch. Secondary gas passages 61 communicate with a space 67 between holding cap 57 and nozzle protecting cap 51. Nozzle protecting cap 51 establishes communication for the space 67 between itself and holding cap 57 on the outside with space 69 between itself and nozzle 41 on the inside, and is provided with a large number of through-holes (i.e. secondary gas swirler) 53 that are formed at fixed intervals inclined to the circumferential direction so as to generate rotation of the secondary gas passing therethrough. The flow of secondary gas issuing from secondary gas passage 61 within holding cap 57 after passing through secondary gas swirler 53 constitutes a rotary flow, and is ejected from secondary gas nozzle orifice 55 at the tip of nozzle protecting cap 51 so that it surrounds the circumference of the plasma arc rotary flow. The direction of rotation of the secondary gas rotary flow is the same as the direction of rotation of the plasma arc rotary flow.

Also, outlet 65 of tertiary gas passage 63 of holding cap 57 constitutes a tertiary gas swirler 65 that is inclined towards the circumferential direction. The rotary flow of tertiary gas from this tertiary gas swirler 65 is ejected so as to surround the circumference of the secondary gas rotary flow. The direction of rotation of the tertiary gas rotary flow also is the same as the direction of rotation of the secondary gas and the plasma arc.

With a plasma torch 30 of such a double swirl construction, as described above, the strength of the secondary gas rotary flow is adjusted by adjusting the secondary gas flow rate, thereby bending the central axis of the plasma arc and so making it possible to adjust the bevel angle.

Figure 6:
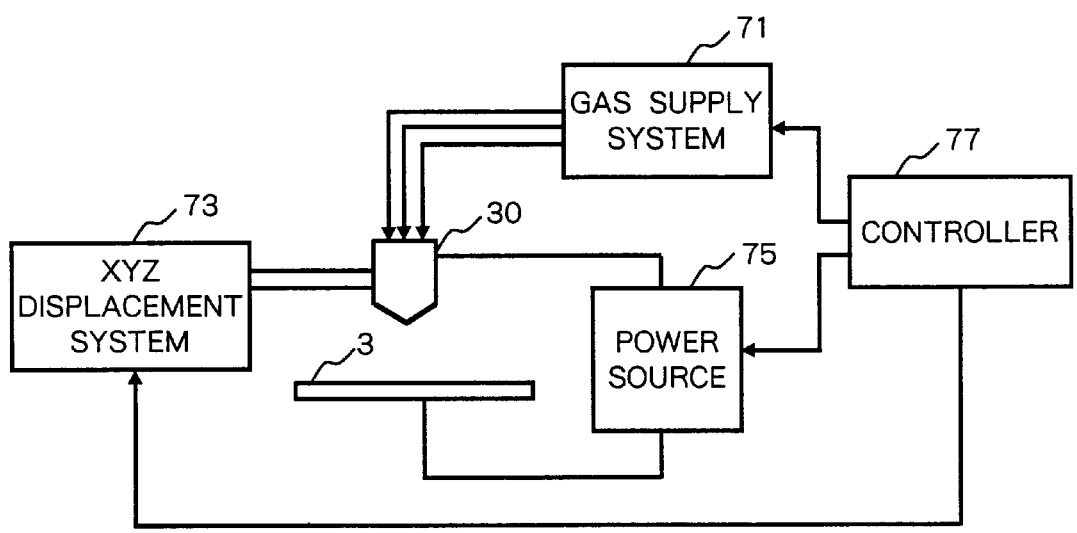
FIG. 6 is a block diagram illustrating the layout of the plasma cutting device of FIG. 4.

The plasma cutting device described above is furthermore, as shown in FIG. 6 (although not in FIG. 4), provided with a gas supply system 71 that supplies working gas, secondary gas and tertiary gas to plasma torch 30, a power source 75 that supplies arc current to plasma torch 30, and gas supply system 71, and a controller 77 that drives and controls gas supply system 71, power source 75 and XYZ displacement system 73 (carriages 23, 27, 29 shown in FIG. 4).

Figure 7:
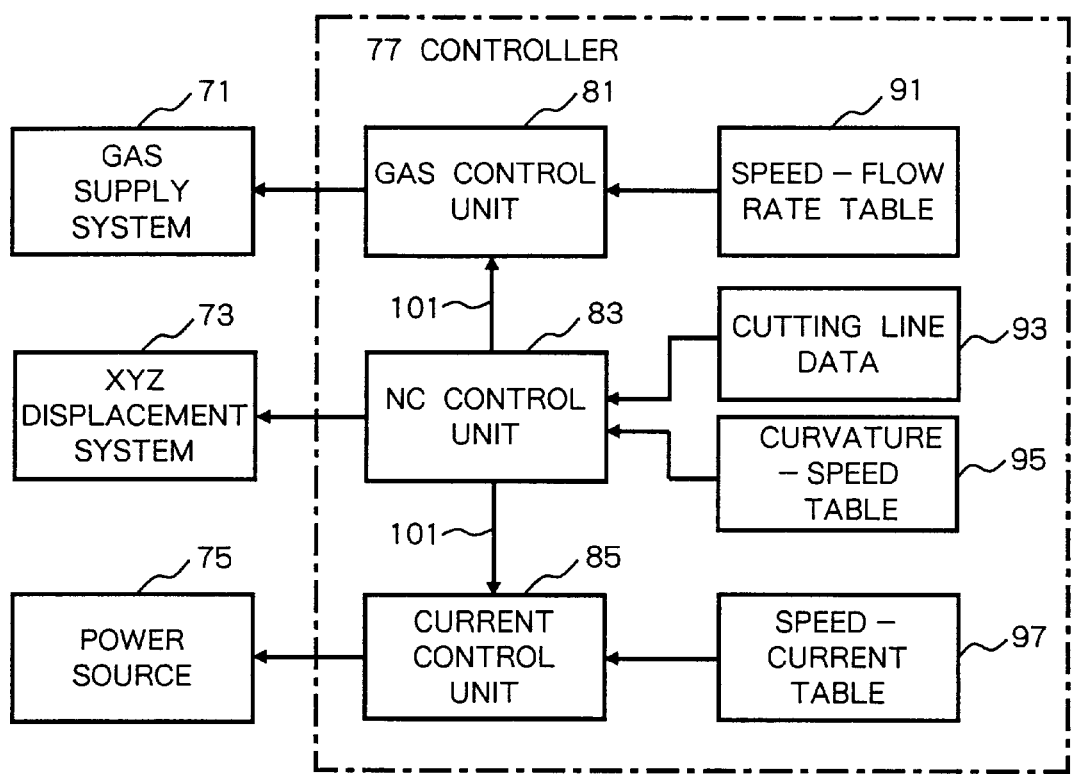
FIG. 7 is a block diagram illustrating the functional layout of the controller of FIG. 6.

FIG. 7 shows the functional layout of this controller 77.

Controller 77 is provided with a gas control unit 81 that controls the working, secondary and tertiary gas flow rates that are supplied to torch 30 by gas supply system 71, an NC control unit 83 that performs numerical control of the torch position and the direction and speed (cutting speed) with which XYZ displacement system 73 displaces torch 30, and a current control unit 85 that controls the arc current value that is supplied to torch 30 by power source 75.

NC control unit 83 is provided with cutting line data 93 that define a cutting line matching the shape of the product that is to be cut out from the work. Also, NC control unit 83 is provided with a curvature-speed table 95 in which are stored the curvature of the cutting line and the cutting speed appropriate to that curvature such that they are in correspondence. It should be noted that "curvature" as used herein is not necessarily restricted to curvature as defined geometrically (the reciprocal of the radius of curvature) but could be any data obtained from cutting line data 93 that enable the magnitude of curvature to be evaluated, such as for example the radius of curvature, the angle of intersection of two adjacent straight lines on a cutting line drawn microscopically as a polygonal line, or, if individual portions on the cutting line are categorized for example as straight line, gentle curve, corner, or sharp curve etc., the names of these categories, etc. By acquiring from curvature-speed table 95 whilst cutting is performed a cutting speed suitable to the curvature of the portion of the cutting line that is currently being cut, whilst torch 30 is being displaced along the cutting line calculated from the cutting line data 93, NC control unit 83 controls the speed of displacement of torch 30 at this cutting speed (i.e. the actual cutting speed).

In curvature-speed table 95, there is defined a curvature-speed relationship such that the cutting speed becomes lower as the curvature becomes larger (as the curve becomes sharper). Preferably the cutting speed corresponding to each curvature is a speed such that, if a curve of this curvature is cut with this cutting speed, the positional offset of the upper kerf track and lower kerf track resulting from the cutting lag is less than an allowed value such that it presents little practical problem or can be neglected. The simplest example of the definition of curvature-speed table 95 would be:

(1) straight lines and gentle curves whose curvature is less than a prescribed value: cutting speed to be a prescribed high speed; and (2) corners and sharp curves where the curvature is more than a prescribed value: cutting speed to be a prescribed low speed.

If such a curvature-speed table 95 is employed, cutting is performed at high speed in the straight lines and gentle curves of the external shape line of the product, and cutting is performed at low speed on sharp curves such as corner portions of the external shape line and/or holes in the interior of the product; as a result, in all parts of the cutting line, positional offset, due to cutting lag, between the upper kerf track and lower kerf track can be kept below a prescribed allowed value such that it essentially presents little problem.

NC control unit 83 supplies to gas control unit 81 and current control unit 85 cutting speed information 101 indicating to what values and with what timing the cutting speed changes during execution of cutting. Gas control unit 81 is provided with a speed-flow rate table 91 in which are stored in correspondence a plurality of cutting speeds that are capable of being used by NC control unit 83 and the secondary gas flow rates for controlling the bevel angle on the product side practically to a desired value, for example 0 degrees, at each cutting speed. The secondary gas flow rates for making the bevel angle 0 degrees that are stored in this speed-flow rate table 91 tend to become smaller as the cutting speed becomes lower. Gas control unit 81 controls the secondary gas flow rate in accordance with the cutting speed information 101 and speed-flow rate table 91, during cutting. Specifically, in advance of the alteration timings of the cutting speed indicated by cutting speed information 101, gas control unit 81 acquires from speed-flow rate table 91 the secondary gas flow rate corresponding to the cutting speed after changeover and controls the degree of valve opening of the gas supply system 71 such as to effect changeover to a secondary gas flow rate which will be the actual secondary gas flow rate that will be acquired in synchronization with each of these alterations of timing. By means of this secondary gas flow rate control, even though the cutting speed changes depending on the curvature of the cutting line, the bevel angle is always controlled to be substantially constant at practically 0 degrees.

Current control unit 85 is provided with a speed-current table 97 in which are stored in correspondence a plurality of cutting speeds that may be employed by NC control unit 83 and the arc current value for producing the correct amount of input heat to the work from the plasma arc at each cutting speed. The arc current values for producing the correct amount of heat input to the work that are stored in this speed-current table 97 tend to become smaller as the cutting speed becomes lower. Current control unit 85 controls the arc current during cutting in accordance with the cutting speed information 101 and the speed-current table 97.

Specifically, current control unit 85, in advance of the alteration timings of cutting speed indicated by the cutting speed information 101, gets the arc current values corresponding to the cutting speed after alteration from speed-current table 97, and controls the current control parameter of power source 75 such as to effect changeover to arc current values whereby such actual arc current value would be obtained in synchronization with these alteration timings. Thanks to this arc current control, the arc current is controlled to a correct value in accordance with each cutting speed even though the cutting speed varies depending on the curvature of the cutting line. The phenomena of melting rounding and sagging of the upper edges of the cut surface and rounding of the corner edges which are produced when excessively large current is generated therefore do not occur in this embodiment.

It should be noted that the variation of arc current in this way with cutting speed is also taken into account in the value of the secondary gas flow rate in the speed-flow rate table 91 provided in gas control unit 81. Specifically, the secondary gas flow rate values corresponding to the respective cutting speeds that are stored in speed-flow rate table 91 are the secondary gas flow rate values to make the bevel angle of the product a desired value, for example 0 degrees, at this cutting speed and under the conditions of arc current value corresponding thereto.

Figure 8:
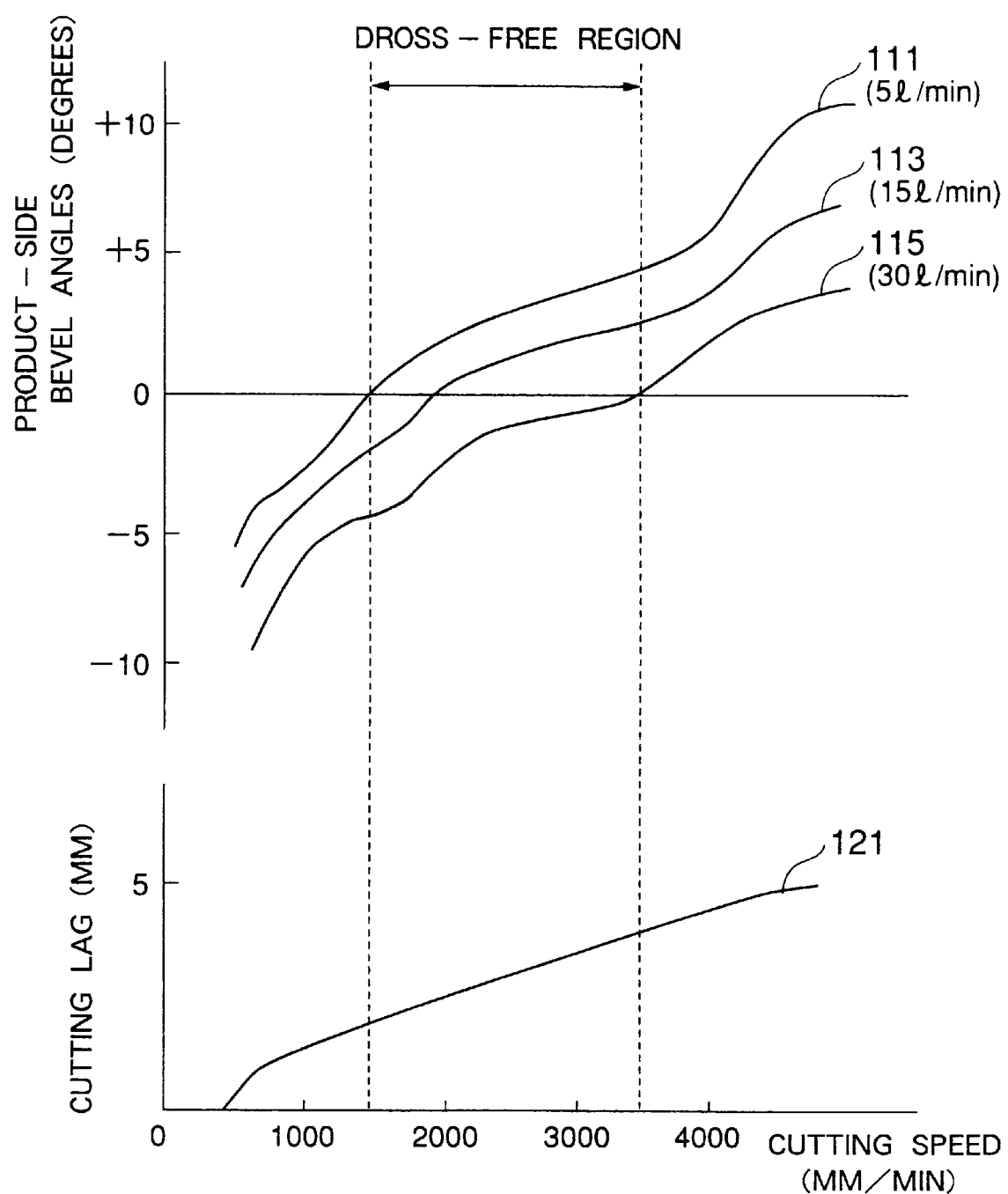
FIG. 8 is a view showing the results of measurement of product-side bevel angle and cutting lag when plasma arc cutting is performed with different cutting speeds, under a specified cutting condition.
Figure 9:
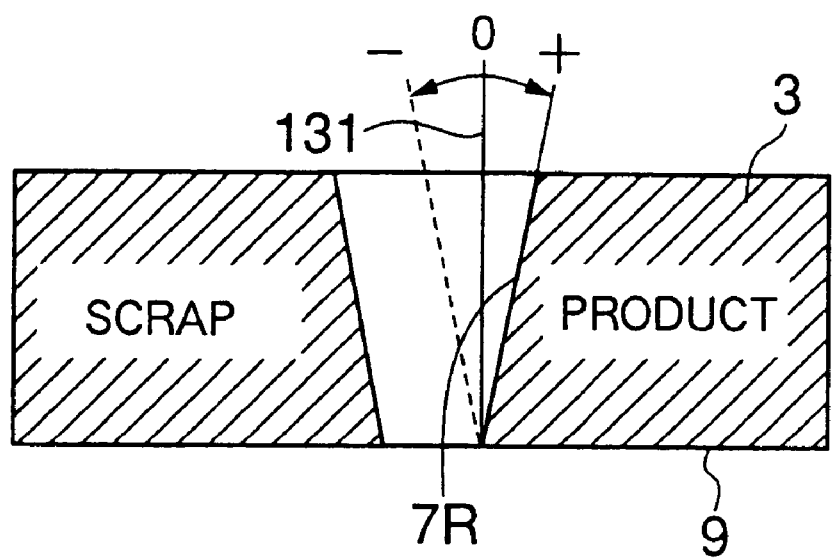
FIG. 9 is a diagram of product-side bevel angle.

FIG. 8 shows the results obtained by measuring the bevel angle of the product and the cutting lag when soft steel of sheet thickness 6 mm is cut using an oxygen plasma torch of rated arc current 120A, the cutting speed being varied. The "product-side bevel angle" referred to herein is the angle as shown in FIG. 9 between the cut surface 7R on the product side of work 3 and the vertical plane 131 from the under-surface 9 of the work; it is defined such that if the angle made by the cut surface 7R and the work under-surface 9 is acute as shown in the Figure, the bevel angle has a positive value, while, if the cut surface 7R is inclined towards the side of the dotted line, the bevel angle has a negative value.

A specific example of control of the cutting speed and secondary gas flow rate performed by controller 77 illustrated in FIG. 7 is described below with reference to FIG. 8.

Controller 77 controls the cutting speed within the dross-free region illustrated in FIG. 8 (range of cutting speed in which the amount of dross adhering to the cut surface is sufficiently small so that it presents no practical problems). For example, in the simplest controller example:

(1) straight lines and gentle curves of curvature less than a prescribed value: the cutting speed is the maximum speed of the dross-free region i.e. 3500 mm/min;

(2) corners and sharp curves of curvature more than the prescribed value: cutting speed is the minimum speed of the dross-free region i.e. 1500 mm/min. As shown by curve 121 in FIG. 8, at the maximum speed of 3500 mm/min in the dross-free region, the cutting lag is about 4 mm. Accordingly, taking as the threshold value a curve such that no practical problems are presented by the positional offset between the upper and lower kerf tracks even with such a cutting lag of 4 mm, in the case of straight lines or gentle curves whose curvature is smaller than this threshold value, the high cutting speed of 3500 mm/min is selected, while, in the case of corners or sharp curves whose curvature is more than this threshold value, the low cutting speed of 1500 mm/min is selected. At a low cutting speed of 1500 mm/min, the cutting lag is, at about 2 mm, about half that at 3500 mm/min, so, even for fairly sharp curves or corners, the positional offset between the upper and lower kerf tracks can be reduced to such a degree that it poses no problems. Thus, when the high cutting speed of 3500 mm/min is selected, the secondary gas flow rate is controlled to 30 liter/min indicated by curve 115, while, when the low cutting speed of 1500 mm/min is selected, the secondary gas flow rate is controlled to 5 liter/min, indicated by a curve 111. By this means, the product-side bevel angle can be always maintained at 0 degrees, irrespective of the cutting speed.

Although an embodiment of the present invention was described above, such embodiments are merely given for purposes of explanation of the present invention and it is not intended that the present invention should be restricted solely to such embodiments. The present invention can therefore be put into practice in various modes other than the embodiment described above.

What is claimed is:

1. A plasma cutting method for cutting a work along a cutting line using a plasma torch of the double-swirl type, comprising the steps of:

displacing said plasma torch along the cutting line of said work with a cutting speed;

varying said cutting speed; and varying the flow rate of said secondary gas or the strength of rotation of said secondary gas in correspondence with changes of said cutting speed to control a bevel angle of a cut surface.

2. The plasma cutting method according to claim 1 in which, in said step of varying the flow rate of secondary gas, there are selectively employed:

(1) a first flow rate condition wherein, when said cutting speed is comparatively high, said secondary gas flow rate or said secondary gas strength of rotation is made comparatively high; and (2) a second flow rate condition wherein, when said cutting speed is comparatively low, said secondary gas flow rate or said secondary gas strength of rotation is made comparatively low.

3. The plasma cutting method according to claim 1 or claim 2, in which, in said step of varying the cutting speed, there are selectively employed:

(1) a first speed condition in which, in locations where said cutting line is a straight line or a comparatively gentle curve, said cutting speed is made comparatively high; and (2) a second speed condition in which, in locations where said cutting line is a corner or a comparatively sharp curve, said cutting speed is made comparatively low.

4. The plasma cutting method according to claim 1 or claim 2, in which, in said step of varying the cutting speed, there are selectively employed:

(1) a first speed condition in which, in locations corresponding to portions of said cutting line other than corners of the external shape of the product, said cutting speed is made comparatively high; and (2) a second speed condition in which, in locations of said cutting line corresponding to said corners or holes, said cutting speed is made comparatively low.

5. The plasma cutting method according to claim 1 in which, in said step of varying the flow rate of secondary gas, said secondary gas flow rate is controlled in accordance with said cutting speed so as to maintain the bevel angle on the product side of said work practically constant at a prescribed value, even though said cutting speed varies.

6. The plasma cutting method according to claim 1 in which, in said step of varying the cutting speed, said cutting speed is varied in accordance with the location of said cutting line.

7. The plasma cutting method according to claim 6 in which, in said step of varying the cutting speed, said cutting speed is varied in accordance with the location of said cutting line such that the positional offset between the upper kerf track and lower kerf track produced by cutting lag is smaller than a prescribed allowed value.

8. A device for cutting a work along a cutting line using a plasma torch of the double-swirl type, comprising:

- a displacement system that displaces said plasma torch with a cutting speed along the cutting line of said work;
- a displacement control unit that controls said displacement system such as to change said cutting speed;
- a gas supply system that supplies working gas and secondary gas to said plasma torch; and
- a gas control unit that controls said gas supply system so as to change the flow rate of said secondary gas or the strength of rotation of said secondary gas in accordance with change of said cutting speed to control a bevel angle of a cut surface.

9. The plasma cutting device of claim 8 in which said gas control unit selectively employs:

(1) a first flow rate condition wherein, when said cutting speed is comparatively high, said secondary gas flow rate or said secondary gas strength of rotation is made comparatively high; and (2) a second flow rate condition wherein, when said cutting speed is comparatively low, said secondary gas flow rate or said secondary gas strength of rotation is made comparatively low.

10. The plasma cutting device of claim 8 or claim 9 in which said displacement control unit selectively employs:

(1) a first speed condition in which, in locations where said cutting line is a straight line or a comparatively gentle curve, said cutting speed is made comparatively high; and (2) a second speed condition in which, in locations where said cutting line is a corner or a comparatively sharp curve, said cutting speed is made comparatively low.

11. The plasma cutting device of claim 8 in which said displacement system maintains the direction of said plasma torch with respect to the surface of said work fixed whilst said work is being cut.

* * * * *